United States Patent
Yoshimura et al.

(10) Patent No.: US 8,726,526 B2
(45) Date of Patent: May 20, 2014

(54) PORTABLE CUTTING MACHINE

(75) Inventors: Kazunobu Yoshimura, Tokyo (JP); Tomofumi Ichiba, Tokyo (JP); Takuma Nonaka, Tokyo (JP); Atsuhito Okada, Hiroshima (JP)

(73) Assignees: Max Co., Ltd., Tokyo (JP); Ryobi Ltd., Fuchu-shi, Hiroshima (JP)

( * ) Notice: Subject to any disclaimer, the term of this patent is extended or adjusted under 35 U.S.C. 154(b) by 268 days.

(21) Appl. No.: 13/203,576

(22) PCT Filed: Mar. 5, 2010

(86) PCT No.: PCT/JP2010/053692
§ 371 (c)(1),
(2), (4) Date: Aug. 26, 2011

(87) PCT Pub. No.: WO2010/101259
PCT Pub. Date: Sep. 10, 2010

(65) Prior Publication Data
US 2012/0011731 A1   Jan. 19, 2012

(30) Foreign Application Priority Data
Mar. 5, 2009   (JP) ................................. 2009-052601

(51) Int. Cl.
*B23D 47/02*   (2006.01)
*B23D 51/02*   (2006.01)

(52) U.S. Cl.
USPC .................. 30/371; 30/374; 30/375; 30/376; 30/388

(58) Field of Classification Search
USPC .................... 30/370, 371, 374–377, 388–391
See application file for complete search history.

(56) References Cited

U.S. PATENT DOCUMENTS

| | | | |
|---|---|---|---|
| 3,701,369 A | 10/1972 | Gronke et al. | |
| 6,755,107 B2 | 6/2004 | Peot et al. | |
| 2002/0170404 A1 | 11/2002 | Peot et al. | |
| 2009/0272242 A1 | 11/2009 | Okada et al. | |
| 2012/0011731 A1* | 1/2012 | Yoshimura et al. | ............. 30/374 |

FOREIGN PATENT DOCUMENTS

| | | |
|---|---|---|
| CN | 2340545 Y | 9/1999 |
| CN | 1386615 A | 12/2002 |
| CN | 2885469 Y | 4/2007 |
| CN | 101085477 A | 12/2007 |
| CN | 101228010 A | 7/2008 |

(Continued)

*Primary Examiner* — Jason Daniel Prone
(74) *Attorney, Agent, or Firm* — Drinker Biddle & Reath LLP (57) ABSTRACT

A portable cutting machine is provided with a cutting machine main body, a surface plate rotatably supported by the cutting machine main body, a saw blade supported by the cutting machine main body rotatably around a first axis, and a lower guard supported by the cutting machine main body rotatably around a second axis. The first axis is located on one side of the surface plate. A part of the saw blade passes through an opening portion formed to penetrate through the surface plate and is exposed to the other side of the surface plate. The part of the saw blade exposed to the other side is covered by the lower guard. The first axis is parallel to the second axis. The first axis is located closer to a side of the surface plate than the second axis.

4 Claims, 6 Drawing Sheets

(56) References Cited

FOREIGN PATENT DOCUMENTS

| | | | |
|---|---|---|---|
| CN | 101829809 A * | 9/2010 | |
| EP | 2404693 A1 * | 1/2012 | |
| JP | 5-31701 | 2/1993 | |
| JP | 2000-52301 | 2/2000 | |
| JP | 2000-135624 | 5/2000 | |
| JP | 2002-79416 | 3/2002 | |
| JP | 2002-127101 | 5/2002 | |
| JP | 2007-196409 | 8/2007 | |
| JP | 2010201599 A * | 9/2010 | |
| WO | WO 2010101259 A1 * | 9/2010 | |

* cited by examiner

PORTABLE CUTTING MACHINE

TECHNICAL FIELD

The present invention relates to a portable cutting machine.

BACKGROUND ART

The conventional portable cutting machine, as shown in Patent Documents 1 and 2, is constructed so that a lower portion of a saw blade is exposed from a lower surface of a surface plate placed on a workpiece, and a periphery of the exposed saw blade is covered by a lower guard rotatably provided on a main body side of the cutting machine.

PRIOR ART DOCUMENT

Patent Document

Patent Document 1: JP-2002-079416-A
Patent Document 2: JP-2000-052301-A

In the above portable cutting machine, rotation of an output shaft of a motor is reduced and transmitted to a final shaft to which the saw blade is rotatably fixed. A portion of the saw blade below the final shaft is exposed from the lower surface of the surface plate placed on the workpiece when cutting. The workpiece is cut by the exposed saw blade.

The surface plate is arranged below the final shaft (rotation shaft) of the saw blade. The closer the lower surface of the surface plate is to the final shaft, the larger the projecting amount of the saw blade from the lower surface of the surface plate becomes, so that a cutting depth becomes also large.

In the portable cutting machines shown in the Patent Documents 1 and 2, the last shaft of the saw blade is provided in a gear case of the cutting machine main body and in a cylindrical shaft case continuously provided on a side portion of the gear case. Further, the shaft case is used also as a rotation shaft of the lower guard, and a shaft sleeve (shaft hole) of the lower guard is rotatably fitted to an outside of the shaft case.

In the above constitution, parts arranged at the lowermost portion of the cutting machine are lower surfaces of the gear case, the shaft case, and the lower guard. Of these parts, the gear case and the shaft case can be fitted to each other so that their lower surfaces become flush with each other.

However, since the shaft sleeve of the lower guard is rotatably fitted to an outer periphery of the shaft case, the lower surface of the shaft sleeve of the lower guard protrudes more downward than the lower surface of the shaft case structurally. Furthermore, by a recent demand of body weight reduction, the lower guard is frequently formed of synthetic resin. In case that the lower guard is formed of the synthetic resin, when a shaft hole in a center of the lower guard is rotatably fitted to the shaft case, if the shaft hole is a simple round-hole, the lower guard cannot be stably supported in the rotating time and is therefore liable to swing left and right, so that there is a risk that the saw blade will be damaged or deformed due to a bump against the lower guard. Therefore, in the center of the lower guard, the shaft sleeve is protruded from a peripheral edge of the shaft hole, and this shaft sleeve is fitted to the shaft case, whereby the lower guard can rotate stably.

However, in order to stabilize a rotation of the lower guard, a degree of rigidity is necessary for the shaft sleeve. Therefore, the shaft sleeve must have a thickness above a certain level. To the contrary, in case that the shaft sleeve thickness is increased, this increased thickness portion resultantly protrudes to a lower side of the shaft case. In order to prevent the shaft sleeve from protruding from the lower surface of the surface plate, when the thickness of the shaft sleeve is increased, the position of the surface plate must be moved down in relation to the shaft sleeve. When the position of the surface plate is moved down, the thickness of the shaft sleeve can be made large thereby to permit the stable rotation of the lower guard, but a cutting depth becomes small.

Thus, when the shaft sleeve of the lower guard is made thick, it is impossible to make the cutting depth large. When the shaft sleeve is made thin, it is possible to make the cutting depth large, but it is impossible to secure rigidity of the lower guard. Since the lower guard is a component involved in safety of the cutting machine, and safety quality is not permitted to be lowered, securing of rigidity has priority over that of the cutting depth. Accordingly, it has not been possible to make the cutting depth larger than the depth in the present situation.

If the shaft diameter of the final shaft which fixes the saw blade is made small and the inner diameter of the shaft case is made small, the outer diameter of a bearing for holding the shaft can be made small, and the inner and outer diameters of the shaft sleeve of the lower guard can be also made small, so that sufficient thickness of the shaft sleeve can be similarly secured. However, incase that the shaft diameter of the final shaft is made small, the strength of the final shaft or the bearing is deteriorated. Therefore, this case does not become a realistic solution. Accordingly, it has been not possible to make the inner diameter of the shaft case small, either.

SUMMARY OF INVENTION

Embodiments of the invention provide a portable cutting machine which can secure a thickness of a shaft sleeve of a lower guard to such a degree that a stable rotation of the lower guard can be performed, and simultaneously can improve a cutting performance by making a cutting depth large.

According to the embodiments of the invention, a portable cutting machine is provided with a cutting machine main body (3), a surface plate (6) supported rotatably by the above cutting machine main body (3), a saw blade (1) supported by the above cutting machine main body (3) rotatably around a first axis (O1), and a lower guard (25) supported by the above cutting machine main body (3) rotatably around a second axis (O2). The above first axis (o1) is located on one side of the above surface plate (6). A part of the above saw blade (1) passes through an opening portion (24) extending through the above surface plate (6), and is exposed to the other side of the above surface plate (6). A part of the saw blade (1) exposed to the other side is covered with the above lower guard (25). The above first axis (O1) is parallel to the above second axis (O2). The above first axis (O1) is located closer to the above surface plate (6) side than the above second axis (O2).

The portable cutting machine may include a shaft case (16) fixed to the above cutting machine main body (3). A rotation shaft (9) of the above saw blade (1) may be supported by a bearing in an inside of the above shaft case (16). A shaft sleeve (28) of the above lower guard (25) may be fitted to an outer periphery of the above shaft case (16).

Further, the above shaft case (16) may be made of metal, and the above lower guard (25) may be made of synthetic resin or light metal.

According to the above structure, the center of the outer diameter of the shaft case which becomes an axis (second axis) of the lower guard is provided in a position shifted to the upside of the center of the inner diameter of the shaft case which becomes an axis (first axis) of the rotation shaft of the saw blade. Therefore, the thickness of the lower portion of the shaft case, compared with the case where the first axis is aligned with the second axis, becomes small. The smaller the thickness of the lower portion becomes, the higher the position of the undersurface of the shaft case becomes. When the position of the undersurface of the shaft case becomes high, the downside position of the shaft sleeve can be made high even if the thickness of the shaft sleeve of the lower guard is not made small correspondingly. Therefore, the position of the surface plate can be also made high correspondingly. When the position of the surface plate becomes high, since the projecting amount of the saw blade from the undersurface of the surface plate becomes also large, a cutting-depth can be made large, and cutting performance can be improved.

Further, in case that the shaft case is made of metal, even if the lower portion of the shaft case is made thin in thickness, the upper portion thereof becomes thick to the contrary, so that the whole strength of the shaft case is enough. Further, in the lower guard made of synthetic resin, though strength of the lower guard lowers when the shaft sleeve becomes thin in thickness, since the thickness of the shaft sleeve is not reduced, enough strength of the lower guard can be secured.

DESCRIPTION OF EMBODIMENTS

Figure 1:
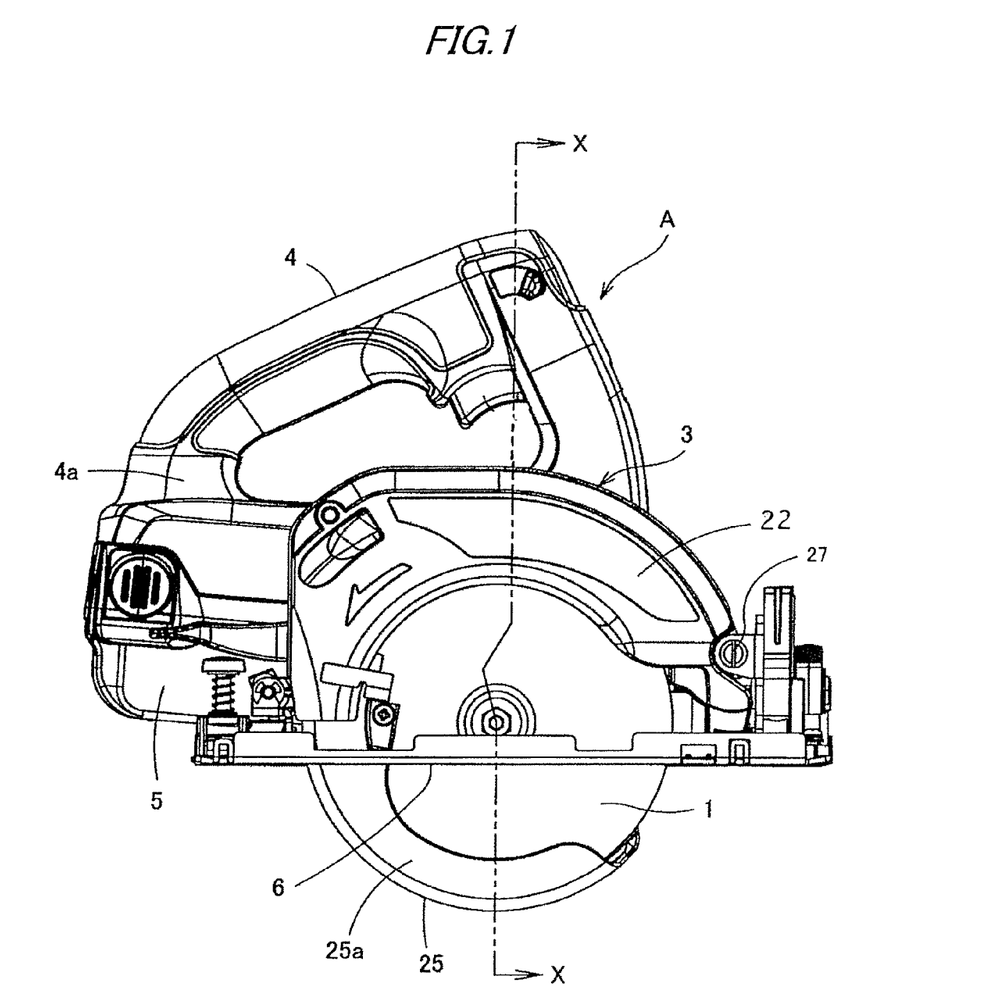
FIG. 1 is a side view of a portable cutting machine according to an exemplary embodiment of the invention.
Figure 2:
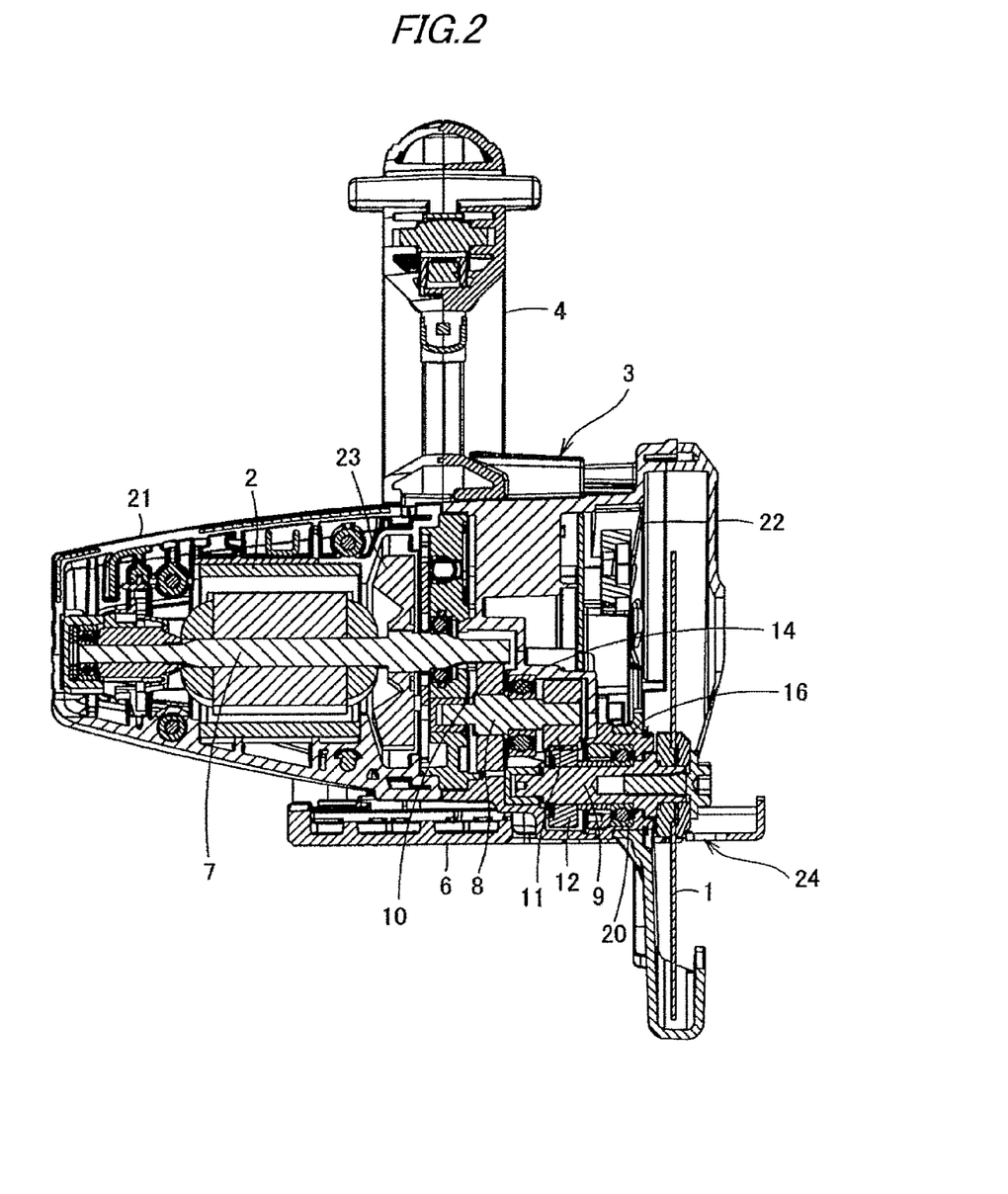
FIG. 2 is a sectional view taken along a line of X-X in FIG. 1.
Figure 3:
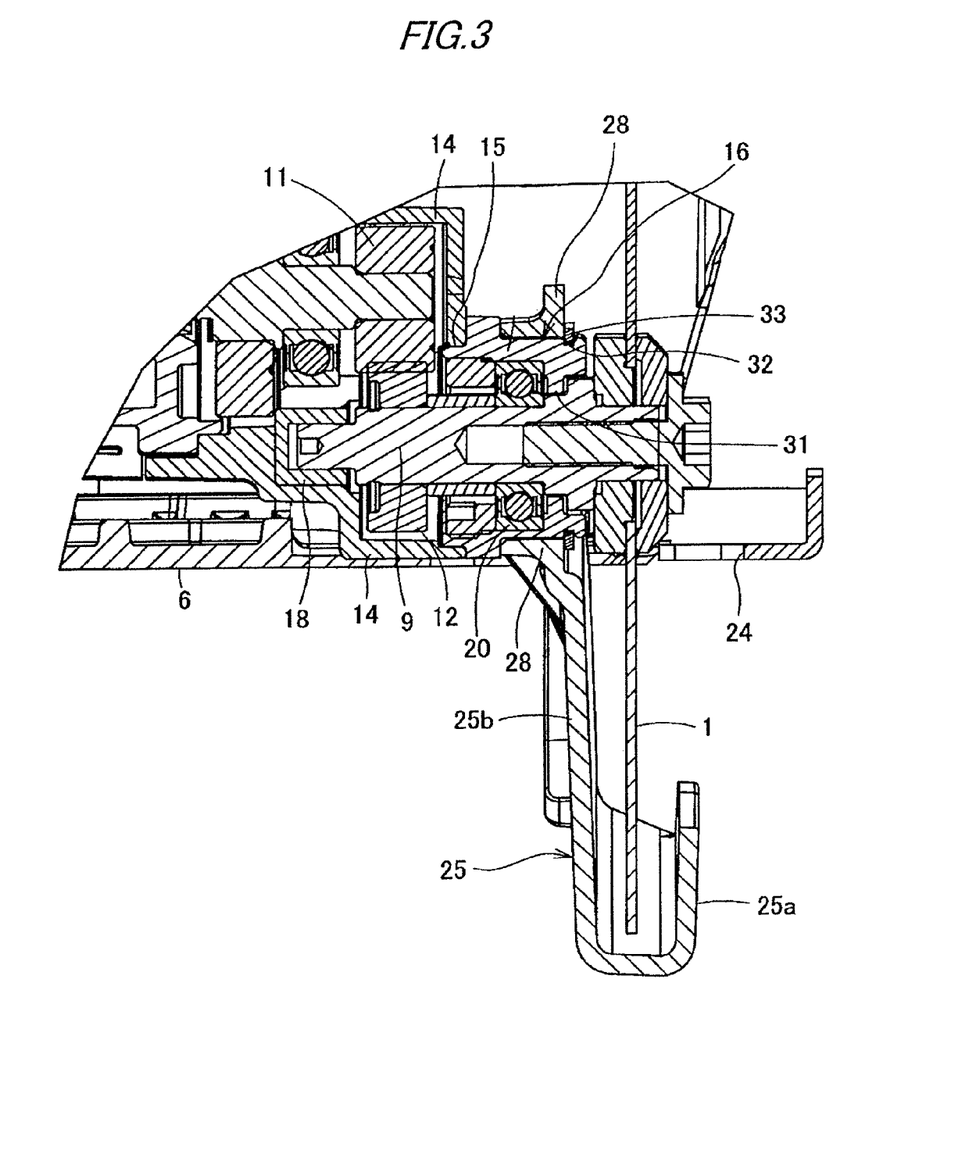
FIG. 3 is an enlarged view of a main portion of FIG. 2.
Figure 4:
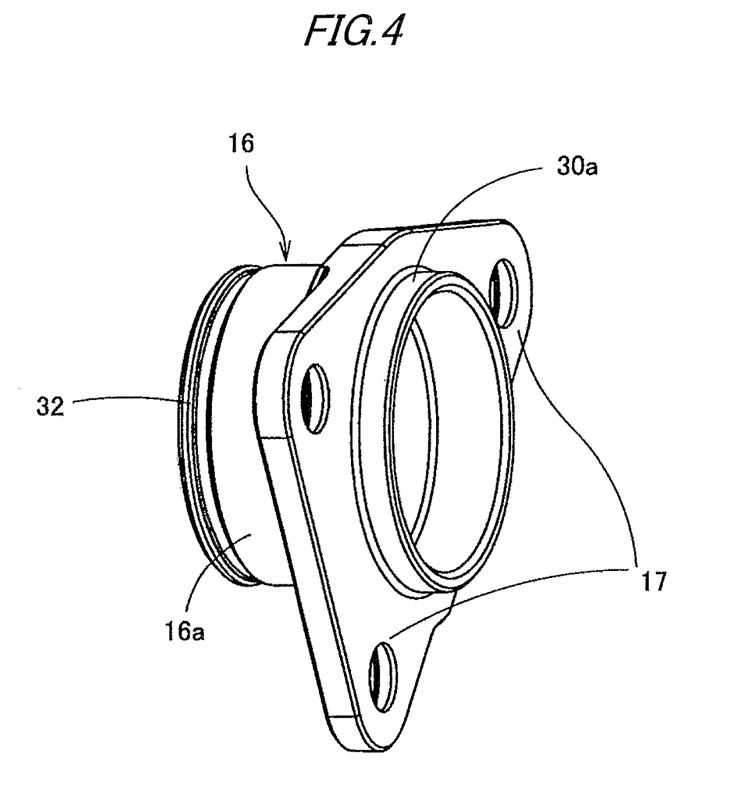
FIG. 4 is a perspective view of a shaft case.

In FIGS. 1 to 3, a reference character "A" represents a portable cutting machine according to an exemplary embodiment of the invention. A saw blade (circular saw) 1 and a motor 2 for driving the saw blade 1 are provided on a cutting machine main body 3 side by side in a right-left direction. On top of the cutting machine main body 3, a handle 4 for operation is arranged in parallel to a cutting direction of the saw blade 1, that is, in a front-back direction. To a lower portion of a rear end 4a of the above handle 4, a battery pack 5 for driving the motor is provided detachably.

A first reduction gear 10 fixed to one end of an intermediate shaft 8 meshes with an output shaft 7 of the motor 2. A second reduction gear 11 fixed to the other end of the intermediate shaft 8 meshes with a third reduction gear 12 fixed to a final shaft 9. To the final shaft 9, the saw blade 1 is fixed. Hereby, as the motor 2 rotates, its rotational force is transmitted through the first, second, and third reduction gears 10, 11, and 12, to the final shaft 9 (rotation shaft of saw blade 1), and then the saw blade 1 rotates.

The above intermediate shaft 8, second reduction gear 11, and third reduction gear 12 are accommodated in a metallic gear case 14 of the cutting machine main body 3. Further, as shown in FIG. 3, in a right portion of the gear case 14, an opening portion 15 is formed, and a metallic shaft case 16 is continuously attached to the opening portion 15. Namely, the shaft case 16 is fixed to the cutting machine main body 3. In the shaft case 16, the final shaft 9 is accommodated, a left end portion of the final shaft 9 is supported by a needle bearing 18 provided in the gear case 14, and a right portion of the final shaft 9 is supported by a bearing (bearing portion) 20 fitted to the inside of the shaft case 16. A right end portion of the final shaft 9 protrudes from the shaft case 16 rightward, and the saw blade 1 is fixed to a shaft end of the final shaft 9.

As shown in FIGS. 3 to 5(b), a main portion 16a of the shaft case 16 is formed cylindrically, a fixing flange portion 17 is projectingly formed outside the main portion 16a, and the flange portion 17 is screwed to the periphery of the opening portion 15 of the gear case 14. The cylindrical main portion 16a is formed so that an outer diameter of an end portion 30a on the gear case side thereof is substantially the same as the inner diameter of the opening portion 15 of the gear case 14. Further, on an inner peripheral surface of the cylindrical main portion 16a, an annular rib 31 is formed, and the bearing 20 is fitted into the cylindrical main portion 16a in a state where the bearing 20 comes into contact with the annular rib 31. Further, at the outer periphery of the other end portion of the cylindrical main portion 16a, a locking groove 32 for attaching a snap ring is formed.

Further, the motor 2 is attached into a motor housing 21, and a substantially half-round portion of the saw blade 1 is covered with a saw cover 22 (refer to FIG. 2) for securing safety. To the output shaft 7 of the motor 2, a fan 23 for cooling the motor is also attached.

Further, a surface plate 6 is a metallic plate-like member which is provided at the bottom of the cutting machine main body 3, and an opening portion 24 extends through a part of the surface plate 6. Below the opening portion 24, a part of the saw blade 1 is exposed. A part of the exposed saw blade 1 is covered with a lower guard 25 which will be described later.

Further, the operation handle 4 is arranged on top of the cutting machine main body 3, of which a front portion is continuously arranged slightly nearer the motor housing 21 side of the front portion of the cutting machine main body 3. An end portion of the handle 4 is arranged continuously on a back surface of the cutting machine main body 3. Between the lower portion of the rear end 4a of the handle 4 and the surface plate 6, an attachment part for the battery pack 5 is formed. The battery pack 5 can be inserted and attached from the back side of the attachment part by a known mechanism, and can be pulled out and detached from the attachment part after lock release.

A front end portion of the surface plate 6 is rotatably supported by the cutting machine main body 3 through a pivot 27 (refer to FIG. 1) provided at the front portion of the cutting machine main body 3. By rotating the surface plate 6 around this pivot 27, the projecting amount of the saw blade 1 from the undersurface of the surface plate 6 changes. Therefore, adjustment of this projecting amount enables adjustment of a cutting depth of a workpiece. As a cutting-depth adjusting mechanism, a known mechanism may be adopted.

Further, as described above, the periphery of the saw blade 1 exposed from the undersurface of the surface plate 6 is covered with the lower guard 25 provided rotatably on the cutting machine main body 3 side. The lower guard 25 is made of synthetic resin (may be made of light metal), and includes, as shown in FIG. 3, a guard portion 25a which has a U-shaped section and is formed like an arc, an arm 25b extending from a base of the guard portion 25a in a radial direction, and a shaft sleeve 28 which constitutes a rotational center in a portion corresponding to a center portion of the arc. The shaft sleeve 28 is formed with thickness by which enough rigidity can be secured. The shaft sleeve 28 of the lower guard 25 is rotatably fitted to the periphery of the shaft case 16, one end of the shaft sleeve 28 engages with the flange portion 17 of the shaft case 16, and the other end thereof is retained by the snap ring 33 (refer to FIG. 3) locked to the locking groove 32 of the shaft case so as not to get out of the shaft case.

Accordingly, the lower guard 25 rotates around the above shaft sleeve 28, and the guard portion 25a moves on the periphery of the saw blade 1.

In case that a workpiece such as wood is cut by the cutting machine having the above constitution, firstly, the projecting amount of the saw blade 1 is adjusted by the cutting-depth adjusting mechanism in response to the thickness of the workpiece. Thereafter, the surface plate 6 is placed on an end portion of the workpiece, and then the motor 2 is activated. As the motor 2 is rotated, the rotational force of the motor is transmitted, as shown in FIG. 2, through the first, second, and third reduction gears 10, 11, 12 to the final shaft 9, whereby the saw blade 1 is rotated and the workpiece is gradually cut.

Since the upper portion of the saw blade 1 is covered with the saw cover 22, and the lower portion of the saw blade 1 is covered with the lower guard 25, safety is secured under the usual state, and also an edge on the periphery of the saw blade 1 is protected from external impact. As the surface plate 6 is placed on an end portion of a workpiece in order to cut the workpiece, and the workpiece is gradually cut by the saw blade 1, the end portion of the workpiece abuts on the lower guard 25 and pushes out the lower guard 25 backward. Therefore, as cutting progresses, the lower guard 25 rotates around the shaft sleeve 28 from the backside to the upside, and lastly retreats to the upside of the surface plate, whereby the lower guard never becomes an obstacle to the cutting operation. The cutting operation is completed in this way.

Figure 5A:
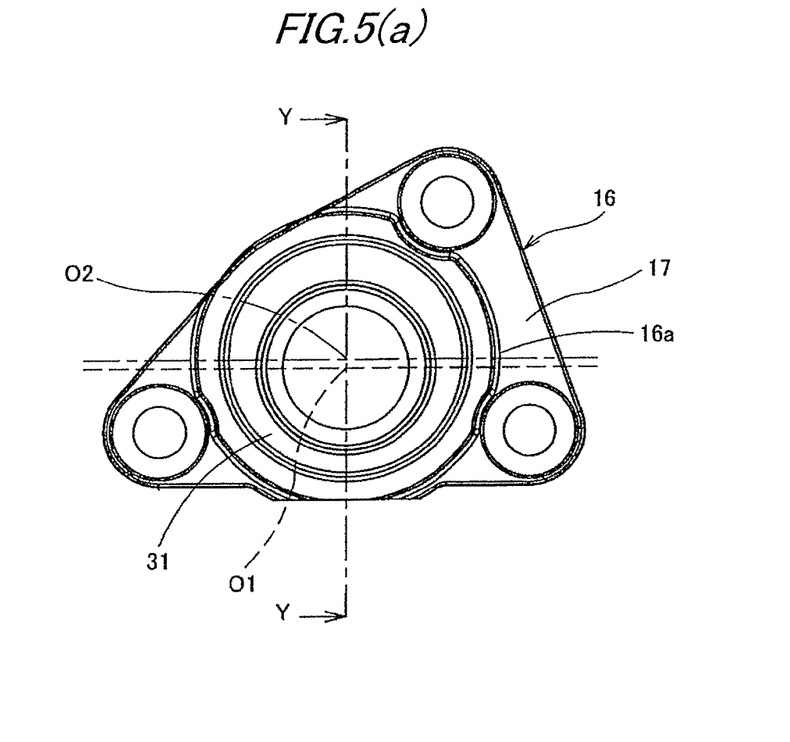
FIG. 5(a) is a side view of the shaft case.
Figure 5B:
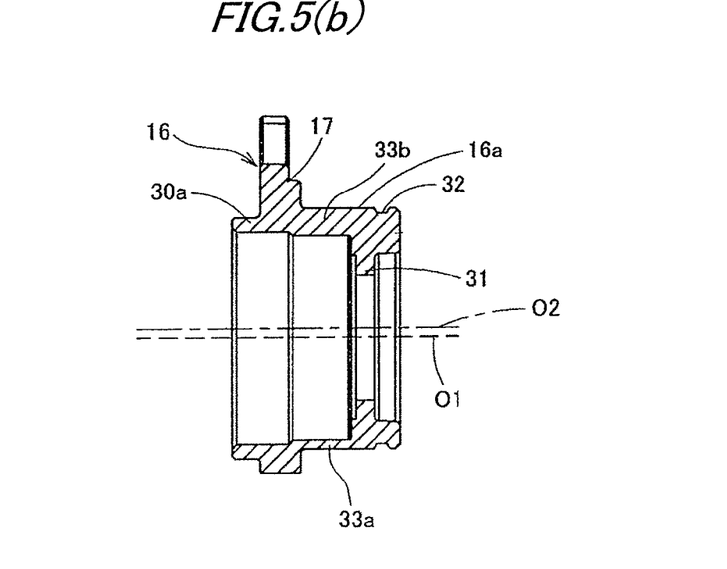
FIG. 5(b) is a sectional view taken along a line of Y-Y in FIG. 5(a).

As shown in FIGS. 3, 5(a) and 5(b), the center of the rotation shaft (final shaft 9) of the saw blade 1 which rotates with the rotation of the motor 2 is the center of the bearing 20 inside the shaft case 16, and also the center of the inner diameter of the shaft case 16. On the other hand, the center of the rotation shaft of the lower guard 25 which rotates with progress of cutting is the center of the shaft sleeve 28, and also the center of the outer diameter of the shaft case 16. Namely, the center of the inner diameter of the shaft case 16 is a rotation axis of the saw blade (axis of rotation shaft 9) O1 (first axis O1). Further, the center of the outer diameter of the shaft case 16 is a axis O2 of the shaft sleeve 28 of the lower guard 25 (second axis O2 which is a rotation axis of the lower guard).

The above two axes are not set on the same axis. The center O2 of the outer diameter of the shaft case 16 which becomes the axis of the lower guard 25 is provided in an eccentric position shifted to the upside from the center O1 of the inner diameter of the shaft case 16 which becomes the axis of the final shaft 9. Namely, the first axis O1 is parallel to the second axis O2, and the first axis O1 is located nearer the surface plate 6 side than the second axis O2.

Namely, since the axis O2 of the lower guard 25 is located upper than the axis O1 of the final shaft 9, as shown in FIG. 5(b), a lower portion 33a of the bearing portion of the shaft case 16 can be made smaller in thickness than the conventional lower portion. When the thickness of the lower portion 33a of the shaft case 16 becomes small, the position of the outer undersurface of the shaft case 16 becomes correspondingly high. When the position of the undersurface of the shaft case 16 becomes high, even if the thickness of the shaft sleeve 28 of the lower guard 25 is not made small correspondingly, the portion which becomes the lower portion of the shaft sleeve 28 is raised. Therefore, the position of the surface plate 6 can be also made high correspondingly. When the position of the surface plate 6 becomes high, the projecting amount of the saw blade 1 from the undersurface of the surface plate 6 becomes also large, so that the cutting-depth can be made large.

Figure 6:
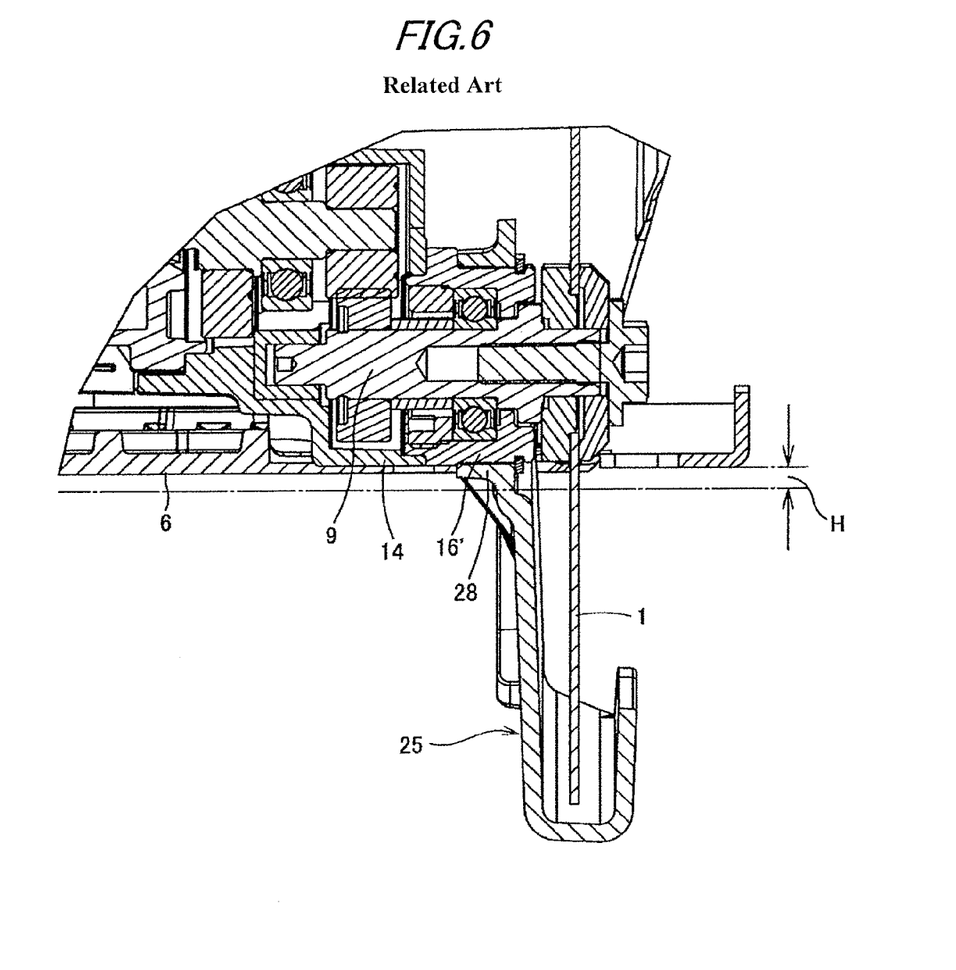
FIG. 6 is a partially enlarged sectional view in case that a shaft case having the conventional structure is adopted.

In case that the above structure is compared with the conventional structure shown in FIG. 6, in the structure in FIG. 6, the center of a final shaft 9 and the center of a shaft sleeve 28 are the same as a axis of a shaft case 16' as described before, and it is not possible from a view of securing a strength to make the thickness of the shaft case 16' and the thickness of the shaft sleeve 28 small. Therefore, the lower portion of the shaft sleeve 28 is on a level with the undersurface of the shaft case 16', or protrudes more downward than the undersurface of the shaft case 16'. Accordingly, the position of a surface plate 6 is lowered by H below the shaft sleeve 28. However, according to the structure shown in FIG. 3, since the position of the shaft sleeve 28 can be raised, the position of the surface plate 6 can be also raised.

Although the lower portion of the shaft case 16 becomes thin in thickness, the upper portion 33b thereof becomes thick to the contrary in case that the shaft case 16 itself is made of metal, so that the whole strength of the shaft case 16 is enough.

Therefore, according to the above portable cutting machine, without decreasing the thickness of the shaft sleeve 28 of the lower guard 25, enough strength can be secured, and simultaneously the cutting-depth can be made large.

INDUSTRIAL APPLICABILITY

The present invention can be applied to a portable cutting machine having a circular saw.

The invention claimed is:

1. A portable cutting machine comprising:
a cutting machine main body;
a surface plate rotatably supported by the cutting machine main body;
a saw blade supported by the cutting machine main body rotatably around a first axis; and
a lower guard supported by the cutting machine main body rotatably around a second axis,
wherein the first axis is located on a first side of the surface plate,
wherein a part of the saw blade passes through an opening portion formed to penetrate through the surface plate and is exposed to a second side of the surface plate,
wherein said part of the saw blade exposed to the second side is covered by the lower guard,
wherein the first axis is parallel to the second axis, and
wherein the first axis is located closer to the first side of the surface plate than the second axis.

2. The portable cutting machine according to claim 1, further comprising:
a shaft case fixed to the cutting machine main body,
wherein a rotation shaft of the saw blade is supported on an inside of the shaft case, and
wherein a shaft sleeve of the lower guard is fitted to an outer periphery of the shaft case.

3. The portable cutting machine according to claim 2, wherein the rotation shaft of the saw blade is supported on the inside of the shaft case through a bearing fitted to the inside of the shaft case.

4. The portable cutting machine according to claim 2, wherein the shaft case is made of metal, and the lower guard is made of synthetic resin or light metal.

* * * * *